Feb. 17, 1925.
S. P. CARTER
1,526,661
SELF LUBRICATED VEHICLE SPRING
Filed March 17, 1923
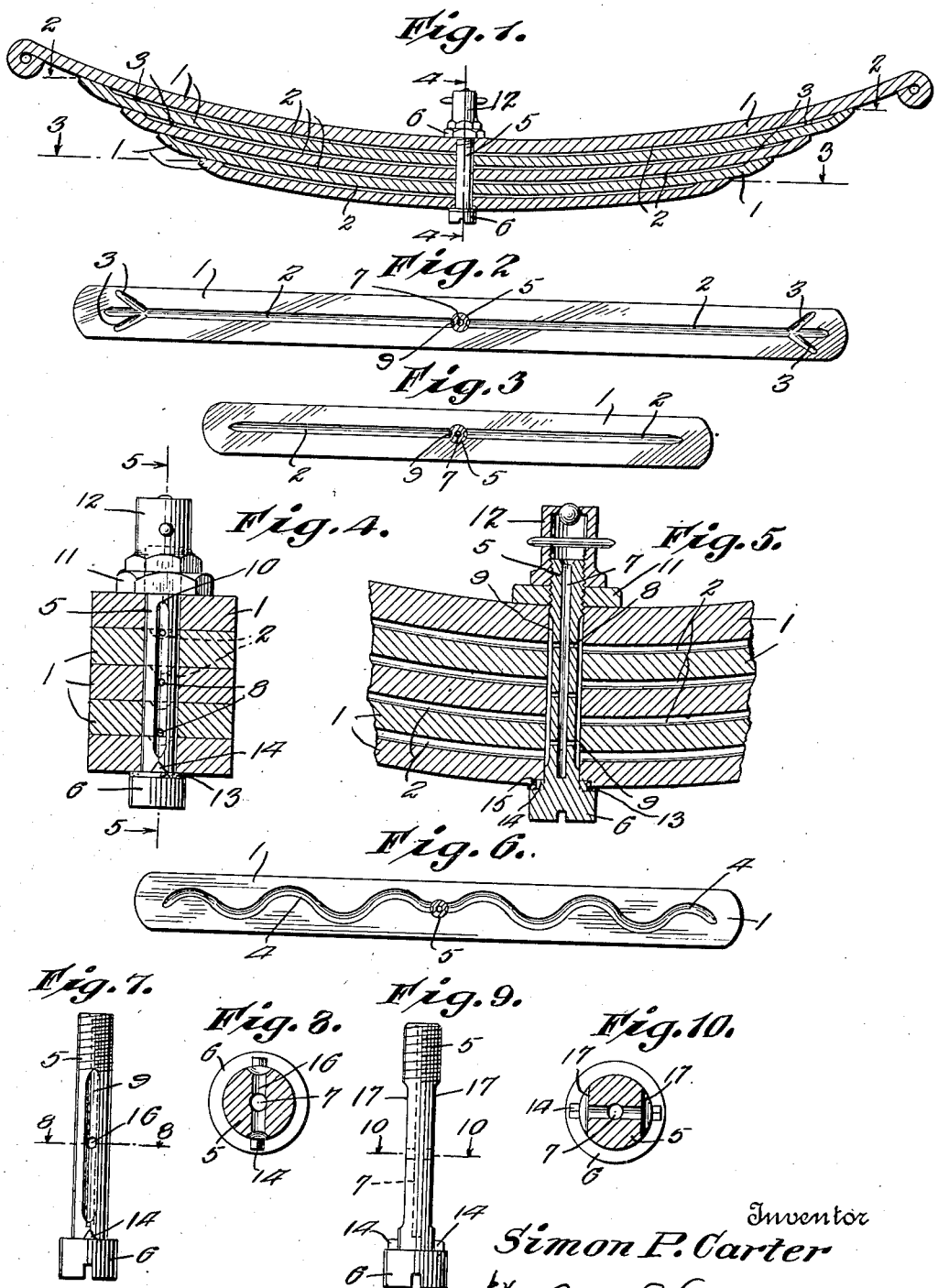
Inventor
Simon P. Carter
by Lester L. Sargent
Attorney Patented Feb. 17, 1925.

1,526,661

UNITED STATES PATENT OFFICE.

SIMON P. CARTER, OF CHARLOTTE, NORTH CAROLINA.

SELF-LUBRICATED VEHICLE SPRING.

Application filed March 17, 1923. Serial No. 625,893.

*To all whom it may concern:*

Be it known that I, SIMON P. CARTER, a citizen of the United States, and a resident of Charlotte, in the county of Mecklenburg and State of North Carolina, have invented new and useful Self-Lubricated Vehicle Springs, of which the following is a specification.

The object of my invention is to provide improved means for the quick, easy and thorough lubrication of vehicle springs; to provide means that will prevent the escape of oil over the outside of the spring; to provide a novel construction of lubricating bolts in such a device. My invention also includes a method of grooving conventional vehicle springs in an improved way and in drilling and grooving or otherwise shaping the central bolts of vehicle springs in a novel manner to permit of lubrication being supplied through the central bolts and grooves in the leaves of the vehicle springs.

I am aware that vehicle springs have been heretofore devised having grooves for lubrication, but my arrangement of grooves, in combination with central bolt channels in the manner disclosed and hereinafter described constitutes a substantial improvement over these prior devices.

I attain the objects of my invention by the mechanism illustrated in the accompanying drawings, in which—

Figure 1 is a longitudinal sectional view through a spring to which my invention is applied;

Fig. 2 is a top plan view of one of the longer leaves of the spring having the branch grooves 3;

Fig. 3 is a top plan view of one of the shorter leaves showing the grooving;

Fig. 4 is a vertical section along line 4—4 of Fig. 1;

Fig. 5 is a vertical section at right angles to the section shown in Fig. 4;

Fig. 6 is a top plan view of a form of grooving which is preferred for very wide springs, such as springs for trucks;

Fig. 7 is a side elevation of a bolt having the grooves 9 and single transverse channels 16;

Fig. 8 is a section on line 8—8 of Fig. 7;

Fig 9 is a side elevation of a bolt having flattened sides 10; and

Fig. 10 is a section on line 10—10 of Fig. 9.

Like numerals indicate like parts in each of the several views.

Referring to the accompanying drawings, Figs. 1, 4 and 5 illustrate vehicle springs with leaves 1 which, with the exception of the main leaf, are provided with longitudinally extending lubricating grooves 2, such as illustrated in Figs. 2 and 3. For the longer leaves of the spring, I also prefer to provide branch lubrication grooves 3 opening out of lubrication grooves 2 and positioned near the ends of the leaves. I provide a central bolt 5, having a central longitudinally extending lubricating channel 7 and one or more transversely disposed channels 8 extending through the central channel, the channels 8 being of relatively small size so as not to weaken the bolts. I also provide opposite external longitudinal grooves 9 which, however, are only of sufficient length to extend over a portion of the bolt which is contained within the series of leaves of the spring, but the extreme upper end of the groove terminates at a point 10, as indicated in Fig. 4, below the outer surface of the main leaf of the spring so that no oil or lubricant may escape over the top of the spring. I provide the bolt with a dowel head 6, said dowel head having opposite lugs 14 to secure the bolt in desired position with the lugs engaging in sockets 15 of the short or least leaf of the spring, as shown in Fig. 5, in which position the grooves 9 of the bolt 5 will be alined with the grooves 2 of the leaves 1 of the spring. I also prefer to provide a suitable washer 13 on the inner side of dowel head 6, as shown in Figs. 4 and 5. I provide on the threaded end of bolt 5 the usual nut 11 and any suitable form of lubrication cap 12, which also functions as a lock nut, such, for example as that illustrated in Fig. 5, or I may suitably combine the nut with the lubrication cap in an integral piece.

For very wide springs, such as used in trucks, I prefer to provide a waved groove 4 as illustrated in Fig. 6.

In lieu of the external grooves 9, I may provide a bolt with flattened surfaces 17, as shown in Figs. 9 and 10 of same relative length as compared with the rest of the bolt as are the grooves 9, and for the same reason. This form of my invention is shown in Figs. 9 and 10.

In using my invention, lubricant is supplied under considerable pressure through lubrication cap 12 and through the channels 7 of bolt 5, and thence through lateral channels 8 into grooves 9 (or flat sides 17, in the form shown in Figs. 9 and 10); and thus into grooves 2 and 3 (or groove 4 in the form shown in Fig. 6), extending longitudinally on the inner surface of all the leaves of the spring, except the main leaf. The lubricant is forced under sufficient pressure so that it is forced from the grooves over the entire friction surface of the spring leaves and up into the branch grooves 3, making the lubrication efficient and thorough.

My invention also contemplates a novel method of producing and applying lubrication means to conventional vehicle springs in use on cars which are manufactured without any means of lubrication, this method consisting of the following steps:

First.—Longitudinally grooving the inner surface of all of the leaves of the spring except the main leaf, the grooves running nearly to the ends of the respective leaves;

Second.—Forming branch grooves opening into the main longitudinal groove, near the ends of the longer leaves;

Third.—I take a conventional center bolt as it now stands in vehicle springs and drill a central channel from the threaded end approximately to the head of the bolt;

Fourth.—I drill one or more suitable and preferably relatively small transverse channels extending through the bolt, and through the longitudinal channel;

Fifth.—I also make opposite external longitudinal grooves on the bolts, said grooves being positioned in alinement with the transverse grooves which open into them, said grooves being of only a length sufficient to extend to, but not more than partially through the main leaf of the spring;

Sixth.—I preferably form locking elements on the head of the bolt to engage corresponding sockets on the underside of the short or last leaf of the spring to lock the bolt in the desired relation to the spring leaves, in which relation the external grooves will be in alinement with the longitudinal grooves of the spring leaves.

As an equivalent step to the forming of the external longitudinal grooves, I may flatten opposite sides of the bolt for an equivalent length, as illustrated in Figs. 9 and 10. I also provide and apply any suitable lubrication cap or cup which, however, is not claimed as a part of my invention.

In grooving the leaves, when the method is applied to conventional springs already in use, the grooves on the inner surfaces of the leaves are ground or cut; but when the springs are manufactured by machinery the grooves are rolled, pressed or stamped in the leaves. The channels in the bolts are suitably drilled or cut.

The term "external grooves" as used in the appended claims when describing the grooves 9, shown in Figs. 7 and 8 is to be construed to include and apply to the opposite flattened surfaces 7 of such a bolt, as illustrated in Figs. 9 and 10 which flattened surfaces function as grooves when in proper position in the spring. The term "center bolt" shall be construed to cover the usual bolt or any bolt inserted through the spring leaves intermediate of the ends or offset from the exact center or median line.

An important advantage of my invention is found in the fact that the main leaf, upon which the greatest strain comes, having no grooves, is not weakened in the slightest degree. Important advantages resulting from the method of lubricating springs above described are that it not only prevents the spring from squeaking, but makes it ride easily and tends to prevent the spring from breaking. Another important advantage of my invention is that the spring as a whole is not weakened by the grooving. The weakest place in a spring leaf is on the plane in which is the orifice through which the center bolt passes. As the longitudinal lubrication groove is alined with this orifice it follows that no metal is taken from the spring leaf at this particular point, so that the spring retains its original strength after being grooved in other portions.

What I claim is:

1. In means for the lubrication of vehicle springs, the combination of a spring, all of the leaves except the main one of which are provided with longitudinally extending grooves on their inner surfaces, the longer leaves having branch grooves near the respective ends of the leaves opening out of the main grooves, a center bolt securing the leaves together having a longitudinally extending central channel extending from the threaded end of the bolt to a point near its head, one or more alined and relatively small transverse channels extending through the bolt and through the central longitudinal channel, and opposite external longitudinally extending grooves into which the transverse channels open, said external grooves being not of a length sufficient to extend to the outer surface of the main leaf of the spring when the bolt is in place.

2. In means for the lubrication of vehicle springs, the combination of a spring, all of the leaves except the main leaf of which are provided with longitudinally extending grooves on their inner surfaces, a center bolt securing the leaves together having a longitudinally extending central channel extending from the threaded end of the bolt to a point near its head, one or more alined and relatively small transverse channels extending through the bolt and through the central longitudinal channel, and opposite external longitudinally extending grooves into which the transverse channels open, said external grooves being not of a sufficient length to extend to the outer surface of the main leaf of the spring when the bolt is in place.

3. In means for the lubrication of vehicle springs, the combination of a spring, all of the leaves except the main one of which are provided with longitudinally extending grooves on their inner surfaces, the longer leaves having branched grooves near the respective ends of the leaves opening out of the main groove, a center bolt securing the leaves together having a central channel extending longitudinally from the threaded end of the bolt to a point near its head, a transverse channel extending through the bolt and through the central longitudinal channel, and opposite external longitudinally extending grooves into which the transverse channel opens, said external grooves being not of a length sufficient to extend to the outer surface of the main leaf of the spring when the bolt is in place.

4. In means for the lubrication of vehicle springs, the combination of a spring, all of the leaves except the main leaf of which are provided with longitudinally extending grooves on their inner surfaces, a center bolt securing the leaves together having a longitudinally extending central channel extending from the threaded end of the bolt to a point near its head, one or more alined and relatively small transverse channels extending through the bolt and through the central longitudinal channel, opposite external longitudinally extending grooves into which the transverse channels open, said external grooves being not of sufficient length to extend to the outer surface of the main leaf of the spring when the bolt is in place, and lugs on the head of the bolt engageable in corresponding sockets in the short or last leaf of the spring, said lugs being positioned to secure the bolt with the external grooves of the bolt in alinement with the longitudinal grooves of the spring.

SIMON P. CARTER.